(12) United States Patent
Preston et al.

(10) Patent No.: US 9,783,931 B2
(45) Date of Patent: Oct. 10, 2017

(54) COATING COMPOSITION

(75) Inventors: Janet Preston, St. Austell (GB);
Graham O'Neill, St. Austell (GB);
Jonathan Phipps, Gorran Haven (GB)

(73) Assignee: Imerys Minerals Limited, Par Cornwall (GB)

( * ) Notice: Subject to any disclaimer, the term of this patent is extended or adjusted under 35 U.S.C. 154(b) by 71 days.

(21) Appl. No.: 14/236,872

(22) PCT Filed: Jul. 27, 2012

(86) PCT No.: PCT/GB2012/051832
§ 371 (c)(1),
(2), (4) Date: Jul. 29, 2014

(87) PCT Pub. No.: WO2013/017857
PCT Pub. Date: Feb. 7, 2013

(65) Prior Publication Data
US 2014/0343172 A1    Nov. 20, 2014

(30) Foreign Application Priority Data
Aug. 3, 2011  (GB) .................................. 1113385.7

(51) Int. Cl.
*D21H 19/20*  (2006.01)
*D21H 19/60*  (2006.01)
(Continued)

(52) U.S. Cl.
CPC ............. *D21H 19/20* (2013.01); *D21H 19/60* (2013.01); *D21H 25/06* (2013.01); *D21H 11/14* (2013.01);
(Continued)

(58) Field of Classification Search
None
See application file for complete search history.

(56) References Cited

U.S. PATENT DOCUMENTS 5,576,617 A      11/1996  Webb et al.
5,981,625 A *    11/1999  Zou et al. ..................... 523/161
(Continued)

FOREIGN PATENT DOCUMENTS

EP    0 487 497 A1    5/1992
EP    1 743 976 A1    1/2007
(Continued)

OTHER PUBLICATIONS

Biederman et al. ("Mineral Contents in Paper and Board Recycled to Paperboard for Food Packaging"; Packaging and Technology Science, vol. 24, pp. 61-73, Published online Sep. 17, 2010), 13 pages.*

(Continued)

*Primary Examiner* — Laura Powers
(74) *Attorney, Agent, or Firm* — Finnegan, Henderson, Farabow, Garrett & Dunner LLP

(57) ABSTRACT

A barrier coating composition may include an alcohol-based binder and an inorganic particulate. The barrier coating composition may be used in various ways, including in paper products including the barrier composition, methods of preparing the paper products, articles, particularly food grade packaging formed from the paper products, and packaged products, particularly packaged foodstuffs including the packaging.

19 Claims, 5 Drawing Sheets

(51) Int. Cl.
*D21H 19/40* (2006.01)
*D21H 19/84* (2006.01)
*D21H 19/44* (2006.01)
*D21H 25/06* (2006.01)
*D21H 11/14* (2006.01)

(52) U.S. Cl.
CPC ............. *D21H 19/40* (2013.01); *D21H 19/44* (2013.01); *D21H 19/84* (2013.01); *Y10T 428/24934* (2015.01); *Y10T 428/31895* (2015.04); *Y10T 428/31993* (2015.04); *Y10T 428/31996* (2015.04)

(56) References Cited

U.S. PATENT DOCUMENTS

| | | | |
|---|---|---|---|
| 6,274,226 B1* | 8/2001 | Londo et al. | 428/32.37 |
| 2005/0170959 A1* | 8/2005 | Iwasaki et al. | 503/200 |
| 2006/0068212 A1 | 3/2006 | Wilhoit et al. | |
| 2006/0124033 A1* | 6/2006 | Pruett et al. | 106/486 |
| 2009/0321681 A1 | 12/2009 | Skuse et al. | |
| 2011/0132975 A1 | 6/2011 | Toft et al. | |

FOREIGN PATENT DOCUMENTS

| | | |
|---|---|---|
| EP | 1 964 969 A1 | 9/2008 |
| EP | 2 501 765 B1 | 2/2016 |
| WO | WO 2005/095712 A1 | 10/2005 |
| WO | WO 2006/053719 A1 | 5/2006 |
| WO | WO 2009/051577 A1 | 4/2009 |
| WO | WO 2010/141581 A1 | 12/2010 |
| WO | WO 2013/017857 A1 | 2/2013 |

OTHER PUBLICATIONS

International Search Report and Written Opinion issued Nov. 6, 2012, in International Application No. PCT/GB2012/051832.

* cited by examiner

Figure 2. Virgin Based Craft Board

US 9,783,931 B2

COATING COMPOSITION

CLAIM FOR PRIORITY

This application is a U.S. national phase entry under 35 U.S.C. §371 from PCT International Application No. PCT/GB2012/051832, filed Jul. 27, 2012, which claims the benefit of priority of Great Britain Patent Application No. 1113385.7, filed Aug. 3, 2011, the subject matter of both of which is incorporated herein by reference.

TECHNICAL FIELD

The present invention is directed to a barrier coating composition and uses thereof, to paper products comprising said barrier composition, to methods of preparing said paper products, to articles, particularly food grade packaging, formed from said paper products and packaged products, particularly packaged foodstuffs, comprising said packaging.

BACKGROUND

Recent studies have discovered that mineral oil in food grade packaging derived from recycled fibres may be migrating in the liquid and vapour phases through the fibre structure and into the package contents. It has also been found that food grade packaging made from virgin fibres is not immune from this phenomena, particularly if the exterior of the food grade product has been coated or printed with an ink which comprises mineral oil.

There is a concern that the migration of mineral oil to foodstuffs poses a risk to human health. The Joint Expert Committee on Food Additives (JECFA) has recommended a maximum Acceptable Daily Intake (ADI) of medium and low viscosity mineral oils of 0.01 mg/kg.

Solutions have been proposed to address this issue. For example, in Switzerland the use of recycled fibre in food packaging is no longer allowed. However, in many countries the usage of recycled fibres is very high and extensive infrastructure is in place to recycle fibres. Further, the increased use of virgin fibres is environmentally unattractive. The cost is also higher with virgin fibre owing to increased use of water and energy associated with the processing of wood.

Another solution proposed is to reduce or eradicate mineral oils from printing inks or to pre-treat the waste materials to reduce or remove mineral oils prior to re-use. Again, however, this will have the effect of increasing costs.

Another possible solution is to minimize the migration of mineral oil into food through the use of barriers. To date, paper, polyethylene and propylene liners have been found not to work or not to work efficiently. Other proposals include the use of PET and aluminium foil liners. However, the use of such water-vapour impermeable foils may lead to increased germ formation and, further, it is has been suggested that the direct contact of food and aluminium may present other adverse health risks. Moreover, all of these methods suffer from higher costs.

Thus, there is a need for new and improved solutions to the problem of mineral oil migration in food grade packaging. The present invention addresses this need through the provision of a barrier coating composition.

SUMMARY OF THE INVENTION

Thus, in accordance with a first aspect, there is provided a paper product comprising a paper substrate and a barrier coating comprising an alcohol-based binder and an inorganic particulate. The paper substrate may be coated or printed with the barrier coating composition. Mineral oil transmission through the barrier coating may be such that the reduction in measured IR intensity at 2920 $cm^{-1}$ is less than 1.0%, as determined by ATR-FTIR spectroscopy in accordance with the method described herein.

In accordance with a second aspect, there is provided a method of preparing a paper product according to the first aspect of the present invention, comprising applying said barrier coating composition to at least a portion of a first surface of the paper substrate.

In accordance with a third aspect, there is provided food or pharmaceutical grade packaging formed from a paper product according to the first aspect of the present invention.

In accordance with a fourth aspect, there is provided a packaged foodstuff or pharmaceutical composition comprising, respectively, the food or pharmaceutical grade packaging of the third aspect of the present invention and a foodstuff or pharmaceutical composition contained therein.

In accordance with a fifth aspect, there is provided a barrier coating composition comprising an alcohol-based binder and an inorganic particulate. Mineral oil transmission through the barrier coating is such that the reduction in measured IR intensity at 2920 $cm^{-1}$ is less than 1.0%, as determined by ATR-FTIR spectroscopy in accordance with the method described herein.

In accordance with a sixth aspect, the present invention is directed to the use of a composition comprising an alcohol-based binder and optionally an inorganic particulate as a barrier coating for a paper product for reducing or preventing the migration of mineral oil through the barrier coating.

In accordance with a seventh aspect, the present invention is directed to the use of a composition comprising an alcohol-based binder and optionally an inorganic particulate as a barrier coating for a paper product, wherein said paper product is formed or formable as food grade or pharmaceutical grade packaging, wherein said composition is coated on an interior surface of said food grade or pharmaceutical grade packaging, and wherein said coating reduces or prevents the migration of mineral oil to the interior of said food grade packaging.

BRIEF DESCRIPTION OF THE FIGURES

FIG. 2 is an ATR-FTIR spectrum for various virgin fibre paper board samples, as prepared in accordance with Examples 1 and 1a.

FIG. 3 is an ATR-FTIR spectrum for various recycled fibre board samples, as prepared in accordance with Examples 1 and 1a.

FIG. 4 is a graph of oil vapour transmission rates (OVTR), tested with n-heptane, for various paper board samples, as prepared in accordance with Examples 2 and 2a.

FIG. 5 is a graph of OVTR for various paper board samples, tested with toluene, for various paper board samples, as prepared in accordance with Examples 2 and 2a.

DETAILED DESCRIPTION OF THE INVENTION

Figure 1:
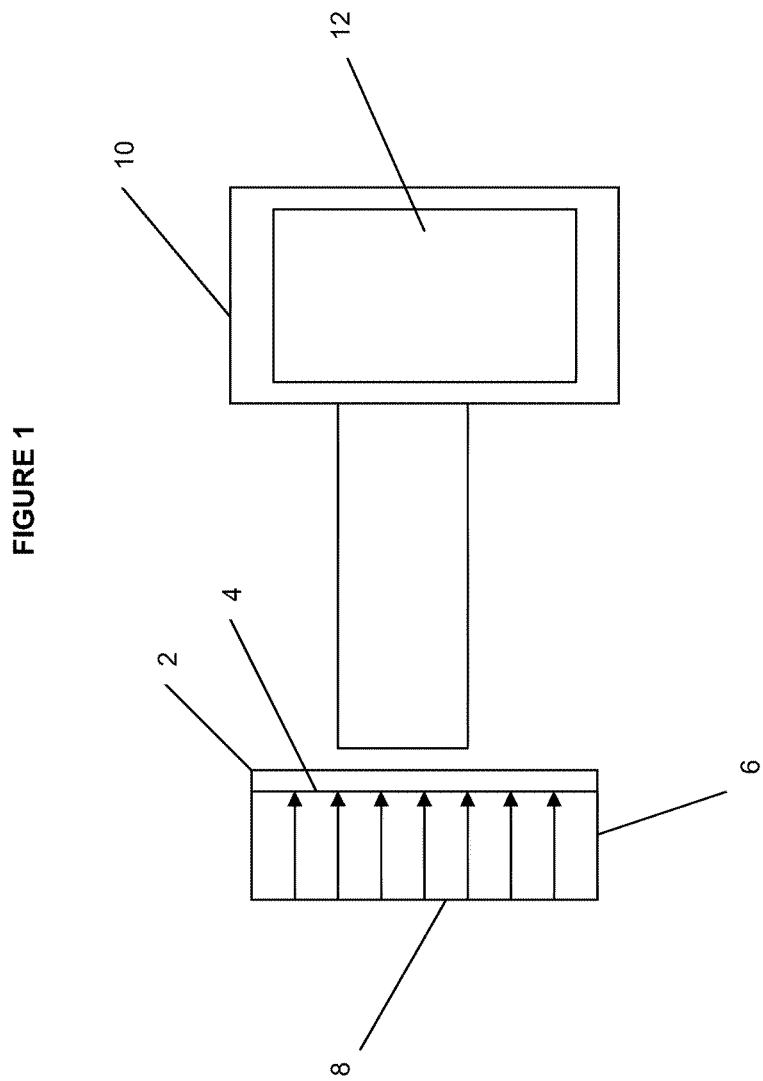
FIG. 1 is a schematic depiction of the method used to determine liquid phase mineral oil transmission through a paper product.

In accordance with the first aspect stated above, the present invention is directed to a paper product comprising a paper substrate and a barrier coating composition suitable for food grade packaging. The barrier coating comprises an alcohol-based binder and an inorganic particulate. In an embodiment, mineral oil transmission through the barrier coating is such that the reduction in measured IR intensity at 2920 cm$^{-1}$ is less than 1.0%, as determined by ATR-FTIR spectroscopy in accordance with the method described herein.

The Inorganic Particulate

The inorganic particulate may, for example, be an alkaline earth metal carbonate or sulphate, such as calcium carbonate, magnesium carbonate, dolomite and gypsum; an aluminosilicate such as hydrous kandite clay including kaolin, halloysite clay, ball clay, anhydrous (calcined) kandite clay such as metakaolin, fully calcined kaolin and mica; or another material such as talc, perlite, diatomaceous earth, magnesium hydroxide and aluminium trihydrate; or combinations thereof.

Advantageously, in one embodiment, the inorganic particulate is an aluminosilicate, for example, kaolin having a high shape factor. In another embodiment, the inorganic particulate is a magnesium silicate.

A kaolin product of high shape factor is considered to be more "platey" than a kaolin product of low shape factor. "Shape factor", as used herein, is a measure of the ratio of particle diameter to particle thickness for a population of particles of varying size and shape as measured using the electrical conductivity methods, apparatuses, and equations described in U.S. Pat. No. 5,576,617, which is incorporated herein by reference. As the technique for determining shape factor is further described in the '617 patent, the electrical conductivity of a composition of an aqueous suspension of orientated particles under test is measured as the composition flows through a vessel. Measurements of the electrical conductivity are taken along one direction of the vessel and along another direction of the vessel transverse to the first direction. Using the difference between the two conductivity measurements, the shape factor of the particulate material under test is determined.

The shape factor of the kaolin may suitably be equal to or greater than about 10. For example, the shape factor may be equal or greater than about 20, or equal or greater than about 30, or equal or greater than about 40, or equal or greater than about 50, or equal or greater than about 60 or about 70. The shape factor may be equal or greater than about 80, for example equal or greater than about 90 or about 100, for example up to about 110 or about 150. For example, the shape factor may lie in one or more of the following ranges: 20 to 150; 20 to 110; 30 to 150; 30 to 110; 40 to 150; 40 to 110; 50 to 150; 50 to 110; 60 to 150; 60 to 110; 70 to 150; 70 to 110; 80 to 150; 80 to 119; 90 to 150; 90 to 110.

In other embodiments, the shape factor of the inorganic particulate, for example, talc, is equal or greater than about 10. For example, the shape factor may be equal or greater than about 20, or equal or greater than about 30, or equal or greater than about 40, or equal or greater than about 50, or equal or greater than about 60 or about 70. The shape factor may be equal or greater than about 80, for example equal or greater than about 90 or about 100, for example up to about 110 or about 150. For example, the shape factor may lie in one or more of the following ranges: 20 to 150; 20 to 110; 30 to 150; 30 to 110; 40 to 150; 40 to 110; 50 to 150; 50 to 110; 60 to 150; 60 to 110; 70 to 150; 70 to 110; 80 to 150; 80 to 119; 90 to 150; 90 to 110.

Unless otherwise stated, the mean (average) equivalent particle diameter ($d_{50}$ value) and other particle size properties referred to herein for the inorganic particulate are as measured in a well known manner by sedimentation of the particulate material in a fully dispersed condition in an aqueous medium using a Sedigraph 5100 machine as supplied by Micromeritics Instruments Corporation, Norcross, Ga., USA (telephone: +1 770 662 3620; web-site: www.micromeritics.com), referred to herein as a "Micromeritics Sedigraph 5100 unit". Such a machine provides measurements and a plot of the cumulative percentage by weight of particles having a size, referred to in the art as the 'equivalent spherical diameter' (esd), less than given esd values. The mean particle size $d_{50}$ is the value determined in this way of the particle esd at which there are 50% by weight of the particles which have an equivalent spherical diameter less than that $d_{50}$ value. The term $d_{90}$ is the particle size value less than which there are 90% by weight of the particles.

The inorganic particulate may have a mean equivalent particle diameter ($d_{50}$) less than or equal to about 10 microns (μm) (by Sedigraph), e.g. less than or equal to about 8 μm, or less than or equal to about 6 μm, or less than or equal to about 4 μm, or less than or equal to about 2 μm, or less than or equal to about 1.5 μm, particularly less than or equal to about 1 μm, e.g. less than or equal to about 0.5 μm, e.g. less than or equal to about 0.4 μm or, e.g., less than or equal to about 0.3 μm. The value of $d_{50}$ may, for example, be in the range of about 0.2 μm to about 2 μm, for example about 0.3 to about 1.5 μm, for example about 0.3 to about 1 μm, or for example about 1 μm to about 2 μm.

The inorganic particulate may have a $d_{90}$ of less than or equal to about 5 μm, particularly less than 3 μm, e.g., less than about 2 μm. The value of $d_{90}$ may, for example, be in the range of about 0.5 μm to about 3 μm, for example about 1 μm to about 3 μm or, for example, about 0.5 μm to 2 μm.

The range of fine content of inorganic particulate, i.e. the wt % less than 0.25 μm may lie in the range 5 wt % to 95 wt %, for example 40 wt % to 90 wt % or 5 wt % to 20 wt %.

In an embodiment, the kaolin has a shape factor equal to or greater than about 30 and a $d_{90}$ of less than about 2 μm. For example, the kaolin may have a shape factor equal to or greater than about 60, or 70, or 90, and a $d_{90}$ of less than about 2 μm.

In another embodiment, the kaolin has a shape factor between about 10 and about 20 and a $d_{50}$ of less than about 1 μm, for example, less than or equal to about 0.5 μm.

In another embodiment, the kaolin has a shape factor between about 25 and about 50 and a $d_{50}$ of less than about 0.3 μm.

In another embodiment, the inorganic particulate is an aluminosilicate having a shape factor between about 20 and 40, and a $d_{50}$ of less than about 0.5 μm.

Kaolin clay used in this invention may be a processed material derived from a natural source, namely raw natural kaolin clay mineral. The processed kaolin clay may typically contain at least about 50% by weight kaolinite. For example, most commercially processed kaolin clays contain greater than about 75% by weight kaolinite and may contain greater than about 90%, in some cases greater than about 95% by weight of kaolinite.

Kaolin clay used in the present invention may be prepared from the raw natural kaolin clay mineral by one or more other processes which are well known to those skilled in the art, for example by known refining or beneficiation steps.

For example, the clay mineral may be bleached with a reductive bleaching agent, such as sodium hydrosulfite. If sodium hydrosulfite is used, the bleached clay mineral may optionally be dewatered, and optionally washed and again optionally dewatered, after the sodium hydrosulfite bleaching step.

The clay mineral may be treated to remove impurities, e.g. by flocculation, flotation, or magnetic separation techniques well known in the art. Alternatively the clay mineral used in the first aspect of the invention may be untreated in the form of a solid or as an aqueous suspension.

The process for preparing the particulate kaolin clay used in the present invention may also include one or more comminution steps, e.g., grinding or milling. Light comminution of a coarse kaolin is used to give suitable delamination thereof. The comminution may be carried out by use of beads or granules of a plastic (e.g. nylon), sand or ceramic grinding or milling aid. The coarse kaolin may be refined to remove impurities and improve physical properties using well known procedures. The kaolin clay may be treated by a known particle size classification procedure, e.g., screening and centrifuging (or both), to obtain particles having a desired $d_{50}$ value or particle size distribution.

When the inorganic particulate of the present invention is obtained from naturally occurring sources, it may be that some mineral impurities will contaminate the ground material. For example, naturally occurring kaolin can be present in association with other minerals. Thus, in some embodiments, the inorganic particulate includes an amount of impurities. In general, however, the inorganic particulate material used in the invention will contain less than about 5% by weight, preferably less than about 1% by weight, of other mineral impurities.

The Alcohol-Based Binder

The barrier coating composition comprises an alcohol-based binder. By "alcohol" is meant an organic compound in which a hydroxyl functional group (—OH) is bonded to a carbon atom. An alcohol-based binder is therefore a composition or compound which contains a hydroxyl functional group bonded to a carbon atom, which is capable of functioning as a binder in a barrier coating composition which is suitable for coating a paper product.

The alcohol-based binder may comprise a primary alcohol having the general formula $RCH_2OH$, a secondary alcohol having the general formula $RR'CHOH$, a tertiary alcohol having the general formula $RR'R"COH$, or a combination thereof. R, R', and R" stand for alkyl groups having from one to twenty carbon atoms.

The alcohol-based binder may comprise primary, secondary and/or tertiary alcohol groups, which may be attached to a polymer backbone.

In an embodiment, the alcohol-based binder is a polymer comprising a carboniferous backbone having hydroxyl functional groups appended therefrom. Advantageously, in one embodiment the polymer is polyvinyl alcohol. Polyvinyl alcohol may be obtained by conventional methods know in the art, such as, for example by partial or complete hydrolysis of polyvinyl acetate to remove acetate groups. Thus, a person of skill in the art will understand that polyvinyl alcohol obtained by hydrolysis of polyvinyl acetate may contain pendant acetate groups as well as pendant hydroxy groups. Thus, in embodiments, the polyvinyl alcohol is derived from partially or fully hydrolysed polyvinyl acetate. The extent of hydrolysis may be such that at least about 50 mole % of the acetate groups are hydrolysed, for example, at least about 60 mole % of the acetate groups are hydrolysed, for example, at least about 70 mole % of the acetate groups are hydrolysed, for example, at least about 80 mole % of the acetate groups are hydrolysed, for example, at least about 85 mole % of the acetate groups are hydrolysed, for example, at least about 90 mole % of the acetate groups are hydrolysed, for example, at least about 95 mole % of the acetate groups are hydrolysed or, for example, at least about 99 mole % of the acetate groups are hydrolysed.

In another embodiment, the polymer is a copolymer of polyvinyl alcohol and other monomers, such as, for example, acetate and acrylate.

In a further aspect, there is provided a barrier composition comprising polyethylene glycol, or a mixture of polyethylene glycol and any one or more of the aforementioned alcohol-based binders, and an inorganic particulate as herein defined, and a paper product coated or printed with said barrier coating composition. In an embodiment, mineral oil transmission through the barrier coating is such that the reduction in measured IR intensity at 2920 $cm^{-1}$ is less than 1.0%, as determined by ATR-FTIR spectroscopy in accordance with the method described herein.

In a further aspect, there is provided a barrier coating comprising polyvinyl acetate, starch-based binder, cellulose-based binder, and/or one or more acrylic latexes, and/or any soluble, suspendable polymer that forms a film when dried as is known in the art and an inorganic particulate as herein defined, and a paper product coated or printed with said barrier coating composition. In an embodiment, mineral oil transmission through the barrier coating is such that the reduction in measured IR intensity at 2920 $cm^{-1}$ is less than 1.0%, as determined by ATR-FTIR spectroscopy in accordance with the method described herein.

The alcohol-based binder component of the barrier coating serves not only as binder when applied to a paper product, but may also enhance the barrier properties of the barrier coating. In an advantageous embodiment, the water vapour transmission rate of a barrier coating composition according to the first aspect of the present invention is improved (i.e., is reduced) compared to a barrier coating comprising which does not comprise both an inorganic particulate and alcohol-based binder component as defined in accordance with the first aspect of the invention.

Mineral Oil Transmission

By "mineral oil" is meant a group of refined mineral hydrocarbons, derived from a non-vegetable (i.e., mineral) source, particularly petroleum distillate, which may be divided into three classes: paraffinic oil, based on n-alkanes; naphthenic oil, based on cycloalkanes; and aromatic oils, based on aromatic hydrocarbons.

"Mineral oil hydrocarbons (MOH)" is an art-recognised term understood to refer to a mineral oil fraction comprising, without distinction, paraffinic, naphthenic and aromatic hydrocarbons.

"Mineral oil saturated hydrocarbons (MOSH)" is an art-recognised term used to refer to a mineral oil fraction comprising paraffinic and naphthenic hydrocarbons.

"Mineral oil aromatic hydrocarbons (MOAH)" is an art-recognised term used to refer to a mineral fraction comprising aromatic hydrocarbons.

MOH typically comprise 5-25% MOAH, with the balance MOSH.

Medium and low viscosity MOH comprise $C_{10}$-$C_{25}$ hydrocarbons having a kinematic viscosity at 100° C. from 3-9 cSt, and molecular weights between 300-500. In an embodiment, the mineral oil comprises $C_{12}$-$C_{25}$ hydrocarbons, for example $C_{12}$-$C_{24}$ hydrocarbons, for example $C_{14}$-$C_{22}$ hydrocarbons, for example $C_{16}$-$C_{22}$ hydrocarbons, for example, $C_{18}$-$C_{22}$ hydrocarbons.

The mineral oil may be derived from recycled pulp, from which the paper products of the present invention may be made. For example, the mineral oil may be derived from printing inks.

Liquid phase mineral oil transmission through the barrier coating is measured in accordance with the following procedure.

With reference to FIG. 1, a barrier coating composition (2) is prepared and printed onto the back side (4) of a paper board (6). A coat weight of between 5-10 gsm is targeted. A single drop of mineral oil (~5 µl) characterized as exhibiting IR absorption phenomena in the 2800-3000 cm$^{-1}$ region is applied to the front (opposite) side (8) of the paper board (6) using, for example, a micropipette. Further details of the mineral oil are given below in the 'Examples'. An Attenuated Total Reflectance (ATR) FTIR spectrometer (10) having a window (12) to detect oil passing through the barrier coating is used to obtain a ATR-IR spectrum on the backside immediately after mineral oil application (i.e., within about 30 seconds of mineral oil application) and at different time intervals, e.g., 1 minute, 10 minutes, 2 hours, 5 hours, 24 hours, 48 hours, 70 hours and 72 hours after application of the mineral oil. The machined used is a Nicolet NEXUS FTIR Thermo Scientific.spectrometer. The IR intensity at 2920 cm$^{-1}$ is monitored. However, as mineral oil has infrared absorption phenomena in the region of 2800-3000 cm$^{-1}$ a different wave number in this region may be monitored. The procedure is repeated for an uncoated board. An ATR-FTIR spectrum of the coated board without addition of mineral oil is also obtained as the base spectrum. The effect the barrier coating composition has on the liquid phase migration (represented by the horizontal arrows in FIG. 1) of the mineral oil through the coated paper board is determined by comparing the variance in the measured IR intensity at 2920 cm$^{-1}$ relative to the blank ATR plate.

In certain embodiments, mineral oil transmission through the barrier coating is such that the reduction in measured IR intensity at 2920 cm$^{-1}$ is less than 20.0%, for example, less than 15.0%, or less than 10.0%, or less than 9.0%, or less than 8.0%, or less than 7.0%, or less than 6.0%, or less than 5.0%, or less than 4.0% or less than 3.0%, or less than 2.0%.

In an embodiment, mineral oil transmission through the barrier coating is such that the reduction in measured IR intensity at 2920 cm$^{-1}$ is less than 1.0%, for example, less than 0.9%, for example, less than 0.8%, for example, less than 0.7%, for example, less than 0.6%, for example, less than 0.5%, for example, less than 0.4%, for example, less than 0.3%, for example, less than 0.2% or, for example, less than 0.1%. Advantageously, liquid phase mineral oil transmission through the barrier coating is undetectable using the measurement procedure described above. By "undetectable" is meant that an ATR-IR spectrum of the barrier coated paper board does not have any peak(s) attributable to the mineral oil in the 2800-3000 cm$^{-1}$ region which is(are) discernable from the base line spectrum. In such embodiments, mineral oil transmission may be determined 70 hours after application of the mineral oil. In other embodiments, mineral oil transmission may be determined immediately after mineral oil application or at time intervals of 1 minute after mineral oil application, or 10 minutes after mineral oil application, or 2 hours after mineral oil application, or 5 hours after mineral oil application, or 24 hours after mineral oil application, or 48 hours after mineral oil application, or 72 hours after mineral oil application.

Vapour phase mineral oil transmission may be determined by the following method. A barrier coated paper board product is prepared in accordance with the method described above. The barrier coated samples are first cut in to circles of diameter 62.5 mm. The samples are left in a fume cupboard overnight prior to testing. Cotton wool pads of standard size are place in the bottom of a sealable beaker. Approximately 7-8 ml of toluene or n-heptane are placed on to the cotton wool pad. This is then covered by the barrier coated samples and the edges are sealed. This is then weighed accurately to 4 decimal places and this is taken as time zero. The sealed beakers are left to stand in the fume cupboard and reweighed every 1 or 2 hours. As the volatile material escapes through the board, this results in a weight loss. Mineral oil vapour transmission rates (OVTR) are given as gsm per day.

Optional Additional Components of the Coating Composition

The coating composition according to the present invention may contain one or more optional additional components, if desired. Such additional components, where present, are suitably selected from known additives for paper coating compositions. Some of these optional additives may provide more than one function in the coating composition. Examples of known classes of optional additives are as follows:

(a) one or more cross linkers;
(b) one or more water retention aids;
(c) one or more viscosity modifiers or thickeners;
(d) one or more lubricity or calendering aids;
(e) one or more dispersants;
(f) one or more antifoamers or defoamers;
(g) one or more optical brightening agents (OBA) or fluorescent whitening agents (FWA;
(h) one or more dyes;
(i) one or more biocides or spoilage control agents;
(j) one or more levelling or evening aids;
(k) one or more grease or oil resistance agents;
(l) one or more surfactants;
(m) one more binders other than the alcohol-based binder defined above, for example, a latex binder such as a styrene-butadiene rubber latex, an acrylic polymer latex, a polyvinyl acetate latex, or a styrene acrylic copolymer latex, which may be carboxylated;
(n) one or more mineral fillers other than the inorganic particulate, for example an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or combinations thereof.

Any of the above additives and additive types may be used alone or in admixture with each other and with other additives, if desired.

For all of the above additives, the percentages by weight (based on the dry weight of inorganic particulate (100%) present in the composition) can vary as understood by those skilled in the art. Where the additive is present in a minimum amount, the minimum amount may be about 0.01% by weight based on the dry weight of the inorganic particulate.

In an embodiment, the barrier coating composition according to the present invention comprises a mixture of the defined inorganic particulate and alcohol-based binder, and optionally one or more further additive components, as discussed above. The barrier coating composition may be in the form of an aqueous suspension of the defined inorganic particulate and alcohol-based binder component, and optionally one or more further additive components, as discussed above.

In an embodiment, the barrier coating composition may comprise at least about 20% by weight inorganic particulate, based on the total weight of the barrier coating composition, for example, at least about 25% by weight inorganic particulate, for example at least about 30% by weight inorganic particulate, for example at least about 35% by weight inorganic particulate, for example at least about 40% by weight inorganic particulate, for example at least about 45% by weight inorganic particulate, for example at least about 50% by weight inorganic particulate, for example at least about 55% by weight inorganic particulate, for example at least about 60% by weight inorganic particulate, for example at least about 65% inorganic particulate, for example at least about 70% by weight inorganic particulate or, for example at least about 75% weight inorganic particulate. In another embodiment, the barrier coating composition comprises no more than about 50% by weight inorganic particulate. In this embodiment, the barrier coating may be applied as a single layer.

The inclusion of an inorganic particulate may advantageously provide additional benefits other than reduced liquid phase mineral oil transmission, such as, for example, making the system cheaper, improving water barrier properties (i.e., reducing moisture vapour transmission rates through coated paper products) and improving the applicability of the barrier coating composition to the paper substrate.

In an embodiment, the barrier coating composition may comprise at least about 20% by weight alcohol-based binder, based on the total weight of the barrier coating composition, for example, at least about 25% by weight alcohol-based binder, for example at least about 30% by weight alcohol-based binder, for example at least about 35% by weight alcohol-based binder, for example at least about 40% by weight alcohol-based binder, for example at least about 45% by weight alcohol-based binder, for example at least about 50% by weight alcohol-based binder, for example at least about 55% by weight alcohol-based binder, for example at least about 60% by weight alcohol-based binder, for example at least about 65% by weight alcohol-based binder, for example at least about 70% by weight alcohol-based binder or, for example at least about 75% weight alcohol-based binder.

In an embodiment, the weight ratio of inorganic particulate to alcohol-based binder ranges from about 5:1 to about 1:10, for example, from about 5:1 to about 1:9, for example, from about 5:1 to about 1:7, for example, from about 5:1 to about 1:5, for example, from about 4:1 to about 1:4, for example, from about 3:1 to about 1:3, for example, from about 2:1 to about 1:2, for example, from about 1.5:1 to about 1:1.5, for example, from about 1.25:1 to about 1:1.25. In another embodiment, the weight ratio of inorganic particulate to alcohol-based binder is about 1:1.

The barrier coating composition may be prepared by mixing the alcohol-based binder, inorganic particulate, when present, and the other optional additives in appropriate amounts into an aqueous liquid to prepare a suspension of said components. The coating composition may suitably be prepared by conventional mixing techniques, as will be known in the art. In embodiments in which the inorganic particulate is present an aqueous slurry of the inorganic particulate may be prepared using a suitable mixer, following which the slurry is blended with a solution of the alcohol-based binder. The resulting mixture may be screened prior to coating.

The Coated Paper Product

In accordance with the first aspect stated above, the present invention is directed to a paper product comprising a barrier coating composition which comprises an inorganic particulate an alcohol-based binder. Advantageously, the barrier coating reduces or prevents the migration of mineral oil (MOH, MOSH, MOAH) from the paper product. Thus, in another aspect, the present invention is directed to the use of a composition comprising an inorganic particulate and an alcohol-based binder as a barrier coating for a paper product for reducing or preventing the migration of mineral from the paper product. The migration or transmission of mineral oil through the coated product may be determined in accordance with the procedures described above.

The term paper product, as used in connection with the present invention, should be understood to mean all forms of paper, including board such as, for example, white-lined board and linerboard, cardboard, paperboard, coated board, and the like. There are numerous types of coated paper and board which may be made according to the present invention, including paper suitable for suitable for food packaging, perishable goods other than food, e.g., pharmaceutical products and compositions, books, magazines, newspapers and the like, and office papers. The paper may be calendered or super calendered as appropriate. Paper suitable for light weight coating (LWC), medium weight coating (MWC) or machine finished pigmentisation (MFP) may also be made according to the present methods.

The paper product comprises a paper substrate which is coated or printed with the barrier coating composition. The paper substrate may be formed on any material which is suitable for making a paper product therefrom. The fibrous substrate may be derived from any suitable source, such as wood, grasses (e.g., sugarcane, bamboo) or rags (e.g., textile waste, cotton, hemp or flax). The fibrous substrate may comprise pulp (i.e., a suspension of cellulose fibres in water), which may be prepared by any suitable chemical or mechanical treatment, or combination thereof. In an advantageous embodiment, the fibrous substrate comprises recycled pulp. The recycled pulp may contain MOH or MOSH or MOAH. The MOH, MOSH and MOAH may come from printing inks, which are retained in the paper substrate formed from the recycled pulp. In an embodiment, the recycled pulp is derived from recycled newsprint.

In an embodiment, the paper substrate has opposing first and second surfaces. The barrier coating composition may be coated on the first surface, the second surface, or both. In an advantageous embodiment, the first surface is a surface which faces the interior of the paper product when it is formed into a three-dimensional product and the opposing second surface faces the exterior of the paper product. Thus, in an embodiment in which the paper product is formed as food grade or pharmaceutical grade packaging, inside of which a foodstuff or pharmaceutical product or composition may be contained, the barrier coating reduces or prevents migration of mineral oil from the paper product to the foodstuff or pharmaceutical product or composition. The packaging may be in the form of a carton (e.g., milk and beverage cartons) or box (e.g., a cereal box) and the like.

The first and/or second surfaces may have other intermediary coatings or layers between each surface and the barrier coating.

Thus, in another advantageous embodiment in which the paper product is formable or formed into a three-dimensional product, which may be suitable as food grade or pharmaceutical grade packaging, at least a portion of a first interior facing surface of the paper substrate is coated with a barrier coating according to the present invention, and a second exterior facing surface of the paper substrate is coated or printed with an ink-based product. In this embodiment, the paper substrate may be derived from recycled pulp containing mineral oil and/or the ink-based product may comprise mineral oil.

Barrier coated paper products of the present invention include brown corrugated boxes, flexible packaging including retail and shopping bags, food and hygiene bags and sacks, milk and beverage cartons, boxes suitable for cereals and the like, self adhesive labels, disposable cups and containers, envelopes, cigarette paper and bible paper.

In another embodiment, the fibrous substrate comprises virgin pulp (i.e., pulp which is not derived from a recycled material). In a further embodiment, the fibrous substrate may comprise a mixture of recycled pulp and virgin pulp.

In advantageous embodiment, the inorganic particulate is aluminosilicate or kaolin, for example, kaolin having a shape factor of at least 30 or at least 90, and the alcohol-based binder is a polymer comprising a carboniferous backbone having hydroxyl functional groups appended therefrom, preferably polyvinyl alcohol. The relative amounts of the kaolin and polyvinyl alcohol may be as described above.

In accordance with the fourth aspect, the present invention is directed to packaged foodstuffs, pharmaceutical products or other perishable goods which are formed from the coated paper products of the present invention. Foodstuffs are many and various and include, for example, grain based products such as breakfast cereals (e.g., oats, cornflakes and the like), flours (e.g., wheat flour and the like) and bakery products (e.g., breads, pastries and the like). Pharmaceutical products include, for example, tablets, powders suspensions and liquid-based products.

In another embodiment, there is provided a non-porous substrate coated with the barrier coating composition of the present invention. The non-porous substrate may be a transparent paper, a translucent paper, a plastic film, such as polyethylene, polypropylene and the like, or a metal foil, such as aluminium foil. The substrate may be coloured, treated (e.g., varnished or laminated), or both.

In another embodiment, there is provided a porous polyolefin substrate (e.g., polyethylene or polypropylene) coated with the barrier coating composition of the present invention.

The coating process may be carried out using standard techniques which are well known to the skilled person. The coating process may also involve calendaring or supercalendering the coated product.

Methods of coating paper and other sheet materials, and apparatus for performing the methods, are widely published and well known. Such known methods and apparatus may conveniently be used for preparing coated paper. For example, there is a review of such methods published in Pulp and Paper International, May 1994, page 18 et seq. Sheets may be coated on the sheet forming machine, i.e., "on-machine," or "off-machine" on a coater or coating machine. Use of high solids compositions is desirable in the coating method because it leaves less water to evaporate subsequently. However, as is well known in the art, the solids level should not be so high that high viscosity and leveling problems are introduced. The methods of coating may be performed using an apparatus comprising (i) an application for applying the coating composition to the material to be coated and (ii) a metering device for ensuring that a correct level of coating composition is applied. When an excess of coating composition is applied to the applicator, the metering device is downstream of it. Alternatively, the correct amount of coating composition may be applied to the applicator by the metering device, e.g., as a film press. At the points of coating application and metering, the paper web support ranges from a backing roll, e.g., via one or two applicators, to nothing (i.e., just tension). The time the coating is in contact with the paper before the excess is finally removed is the dwell time—and this may be short, long or variable.

The coating may added by a coating head at a coating station. According to the quality desired, paper grades are uncoated, single-coated, double-coated and even triple-coated. When providing more than one coat, the initial coat (precoat) may have a cheaper formulation and optionally coarser pigment in the coating composition. A coater that is applying coating on each side of the paper will have two or four coating heads, depending on the number of coating layers applied on each side. Most coating heads coat only one side at a time, but some roll coaters (e.g., film presses, gate rolls, and size presses) coat both sides in one pass.

Examples of known coaters which may be employed include, without limitation, air knife coaters, blade coaters, rod coaters, bar coaters, multi-head coaters, roll coaters, roll or blade coaters, cast coaters, laboratory coaters, gravure coaters, kisscoaters, liquid application systems, reverse roll coaters, curtain coaters, spray coaters and extrusion coaters.

Water may be added to the solids comprising the coating composition to give a concentration of solids which is preferably such that, when the composition is coated onto a sheet to a desired target coating weight, the composition has a rheology which is suitable to enable the composition to be coated with a pressure (i.e., a blade pressure) of between 1 and 1.5 bar.

In one advantageous embodiment, the barrier coating is printed on the paper product, e.g., printed on a surface of the fibrous substrate of the paper product. The printing may utilize a technique selected from offset printing, flexographic printing or rotogravure printing, thereby allowing the barrier coating to be applied to areas where it is required.

Offset printing is a widely used printing technique, as will be well understood by a person of ordinary skill in the art. The barrier coating compositions is transferred (or "offset") from a plate to a rubber blanket, then to the surface of the paper substrate. The paper substrate may be sheet-fed or web-fed. The web-fed process may be heatset or coldset.

Flexographic printing is a widely used printing technique, as will be well understood by a person of ordinary skill in the art. Using this technique the barrier coating composition is transferred from a first roll which is partially immersed in a tank comprising the barrier coating composition. The barrier coating composition is then transferred to the anilox roll (or meter roll) whose texture holds a specific amount of the barrier coating composition since it is covered with thousands of small wells or cups that enable it to meter the barrier coating composition to the printing plate in a uniform thickness evenly and quickly. The paper substrate is finally sandwiched between the plate and the impression cylinder to transfer the barrier coating. The coated paper substrate is then fed through a dryer, which allows the coating to dry. Advantageously, flexographic printing enables the barrier coating composition to be applied in a series of thin layers (e.g., a series of fiver layers with a total coat weight of about 5 gsm) which has sufficient hold out to maintain good barrier properties (to liquid and/or vapour mineral oil transmission) for barrier coating compositions comprising greater than about 60% by weight, for example, greater than about 65% by weight of inorganic particulate, based on the total weight of inorganic particulate and alcohol-based binder.

Rotogravure printing is a widely used printing technique, as will be well understood by a person of ordinary skill in the art.

The total coat weight of the coating may be from about 1 to about 30 gsm. For example, from about 1 to about 20 gsm, for example, from about 1 to about 15 gsm, for example, from about 2 to about 10 gsm, for example, from about 3 to about 10 gsm, for example, from about 4 to about 10 gsm, for example, from about 4 to about 8 gsm or for example, from about 5 to about 8 gsm.

The barrier coating may be applied in a series of coating layers having the same or variable composition. For example, in one embodiment, a first layer of a barrier coating comprising only the alcohol-based binder may be applied to the substrate followed by a top coat of a barrier coating composition comprising alcohol-based binder an inorganic particulate. In an alternative embodiment, two layers of a barrier coating comprising the alcohol-based binder and inorganic particulate may be applied one on top of the other. In these embodiments, the inorganic particulate is advantageously kaolin having a shape factor of at least about 90 and the alcohol-based binder is a polyvinyl alcohol.

The present invention is illustrated with reference to the following non-limiting examples.

EXAMPLES

Example 1

Two barrier coating compositions were prepared: Coating A, based on a 59:41 (weight ratio) blend of a platey kaolin having a shape factor of 100 with a SBR latex; and Coating B, based on a 68:32 (weight ratio) blend of a platey kaolin having a shape factor of 100 with PVOH. The PVOH is derived from a polyvinyl acetate in which about 87-89 mole % of the acetate groups have been hydrolysed.

The platey kaolin was in the form of an aqueous slurry. The slurry was prepared by making down in a small high work input mixer. 0.1 wt. % active on dry Acumer 9300 dispersant was added to water, to give a final solids concentration of 60 wt. %.

The slurry was blended with the PVOH binder solution using a paddle mixer. The colour mixture was then screened through a 38 μm screen.

Figure 2:
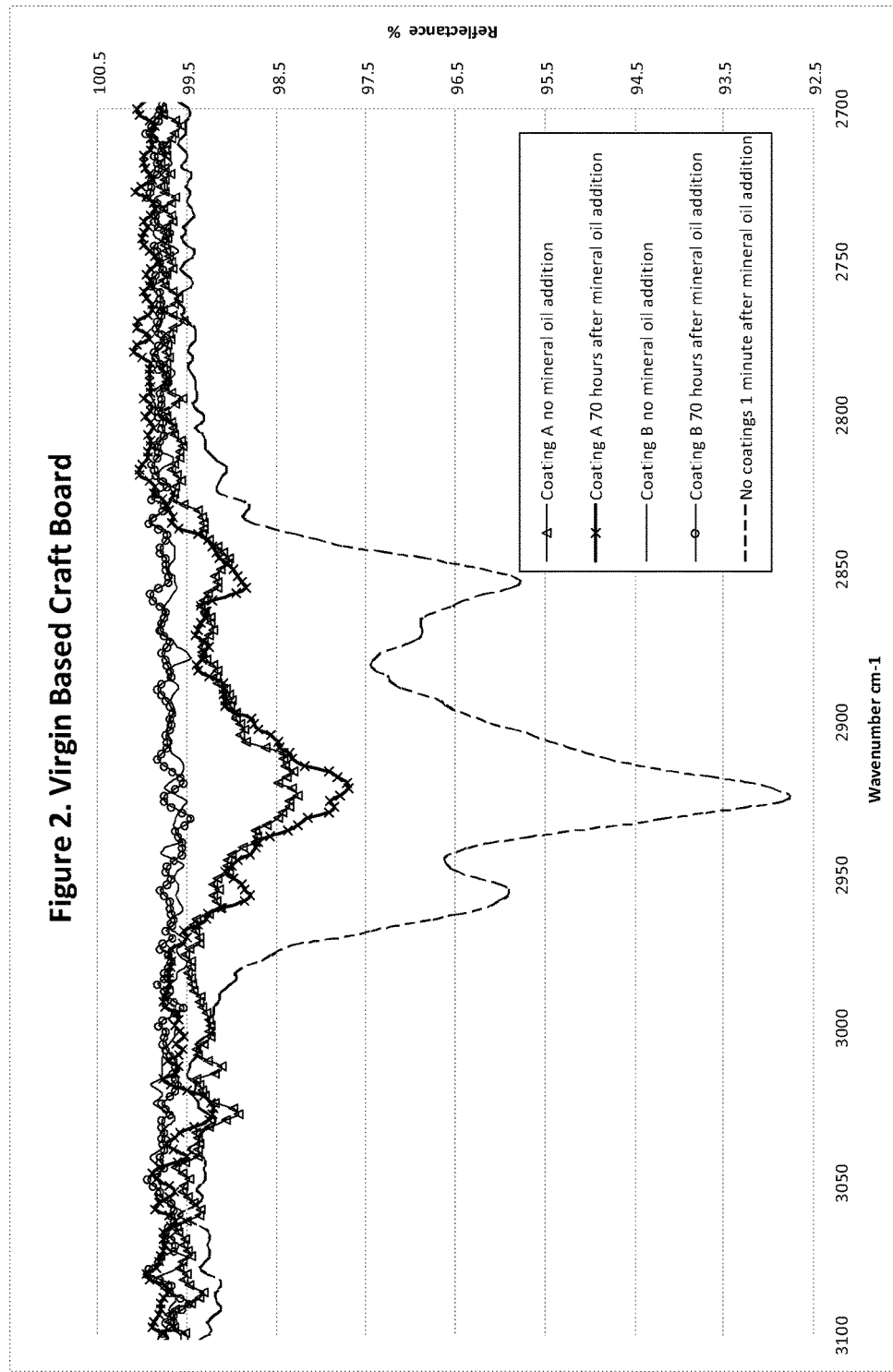
Figure 3:
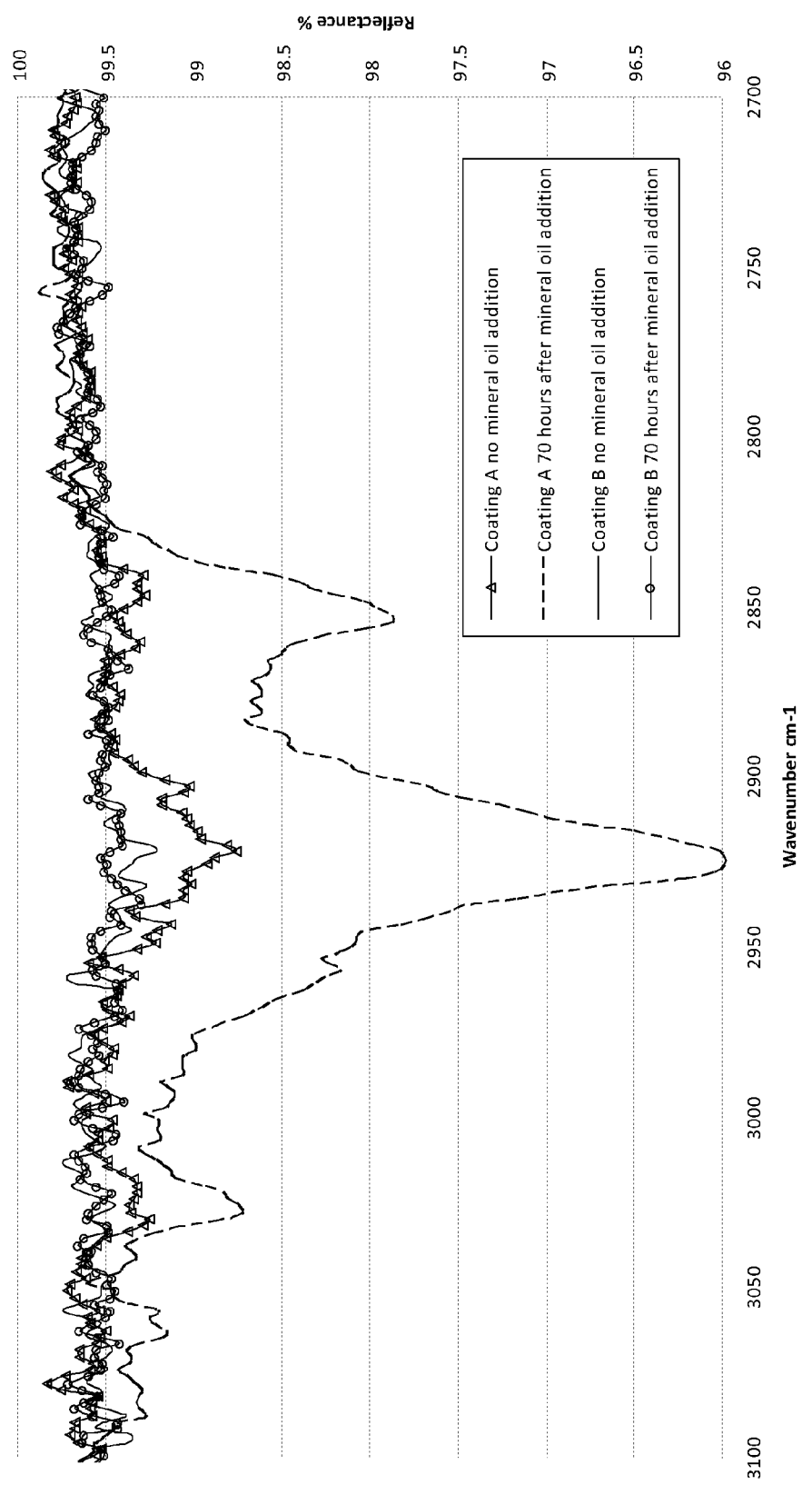

Coating A and B were applied to both virgin fibre and recycled board using a Flexiproof 100 printing press. Five passes were made to obtain a coat weight of about 5 gsm. Printing conditions were as follows:
  distance between anilox and plate=40 (instrument setting)
  distance between plate and paper samples was also=40
  printing speed=80 m/min
  a hot air drier was used to dry each later after each pass; approximately 10 seconds of drying time per pass Example 1a—Liquid Phase Mineral Oil Transmission In accordance with the procedure described above under 'Mineral oil transmission' a drop of mineral oil was presented to one surface of the board and an ATR-FTIR reading was taken on the other side of the board 70 hours after application of the mineral oil (unless otherwise stated), as shown in FIG. 1. Uncoated boards were also tested, as were coated boards without mineral oil addition. The results are presented in FIGS. 2 (virgin fibre board) and 3 (recycled fibre board). It can be seen from these data that the oil easily penetrated when no barrier was present, giving a large peak. Coating A provides a reduced peak, but clearly an amount of mineral oil is passing through the coating. Coating B containing the platey kaolin and PVOH provides an excellent (effectively total) barrier to liquid mineral oil transmission.

The mineral oil was obtained from Cranfield Colours, Ltd. The mineral oil has reference number 'Mineral Oil WTR00813' according to its MSDS (Revision date: 17 Nov. 2010).

Physical and chemical properties of the mineral oil (taken from the MSDS for Mineral Oil WTR00813):
  Appearance: clear liquid
  Colour: colourless
  Odour: mild
  Solubility: insoluble in water
  Mol. Weight: ca. 255.66
  Boiling Point (° C.): 260-370 760 mm Hg
  Melting point (° C.): <0
  Relative density: 0.79-0.95 15
  Vapour pressure: <0.001 kPa 20
  Viscosity: 2.8-15.0 cSt 20
  Flash point (° C.): min. 97 CC (Closed cup).
  Auto ignition temperature (° C.): min. 200
  Flammability limit—lower (%): 0.5
  Flammability limit—higher (%): 7.0

Example 2

In this example, the effectiveness of various coatings to reduce vapour phase mineral oil transmission was determined.

Three coating compositions were prepared in accordance with the method described in Example 1.

Coating C: Platey kaolin having a shape factor of 100+ PVOH binder (68:32 weight ratio). Coating C is therefore the same as Coating B above.

Coating D: PVOH binder only

Coating E: Platey kaolin having a shape factor of 100+a modified ethylene acrylic dispersion (59:41 weight ratio)

Example 2a—Oil Vapor Transmission Test with n-heptane or Toluene

Paper board was coated with either Coating C, D or E using a Flexiproof 100 printing press. An uncoated board was also included as a control.

Figure 4:
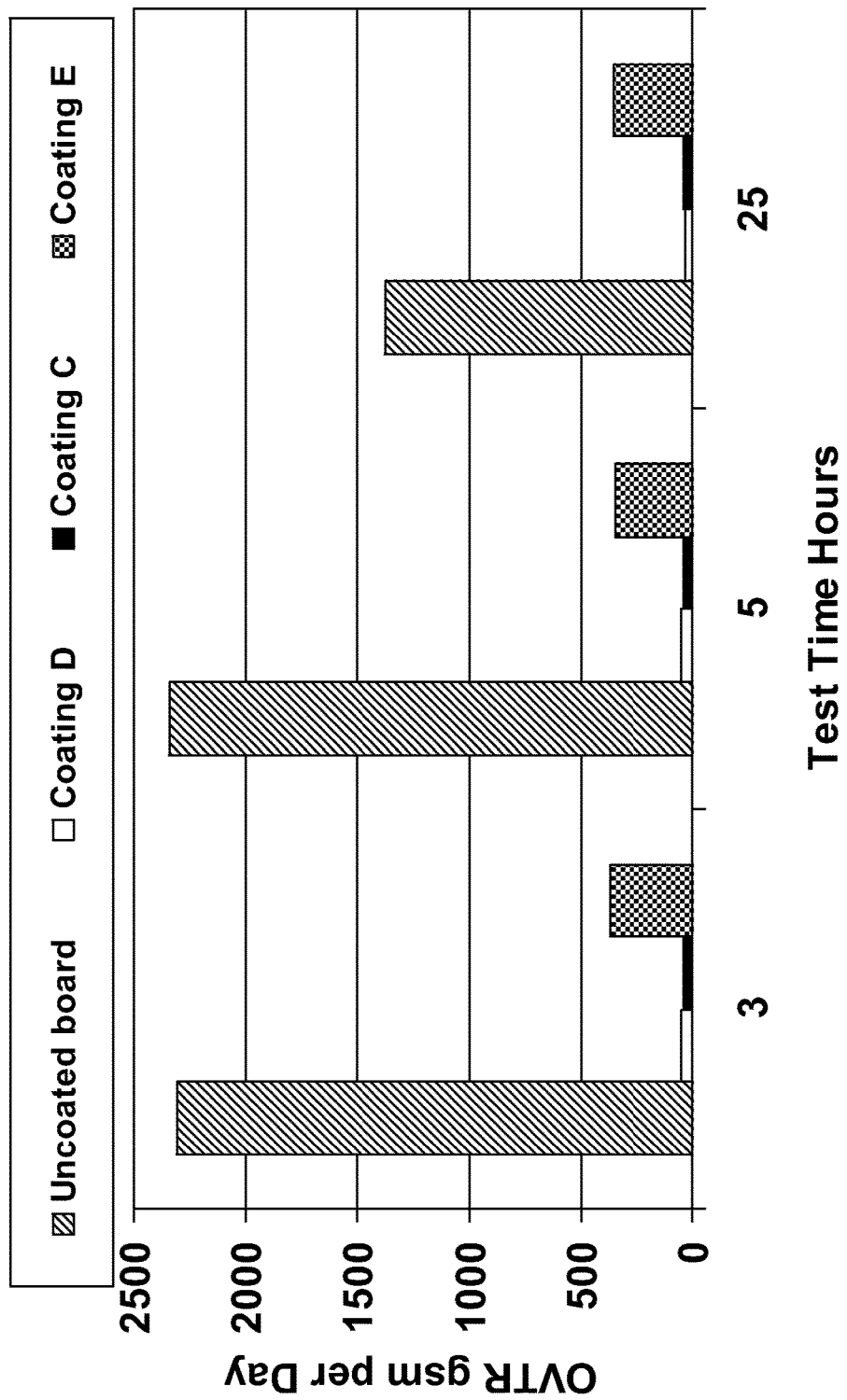
Figure 5:
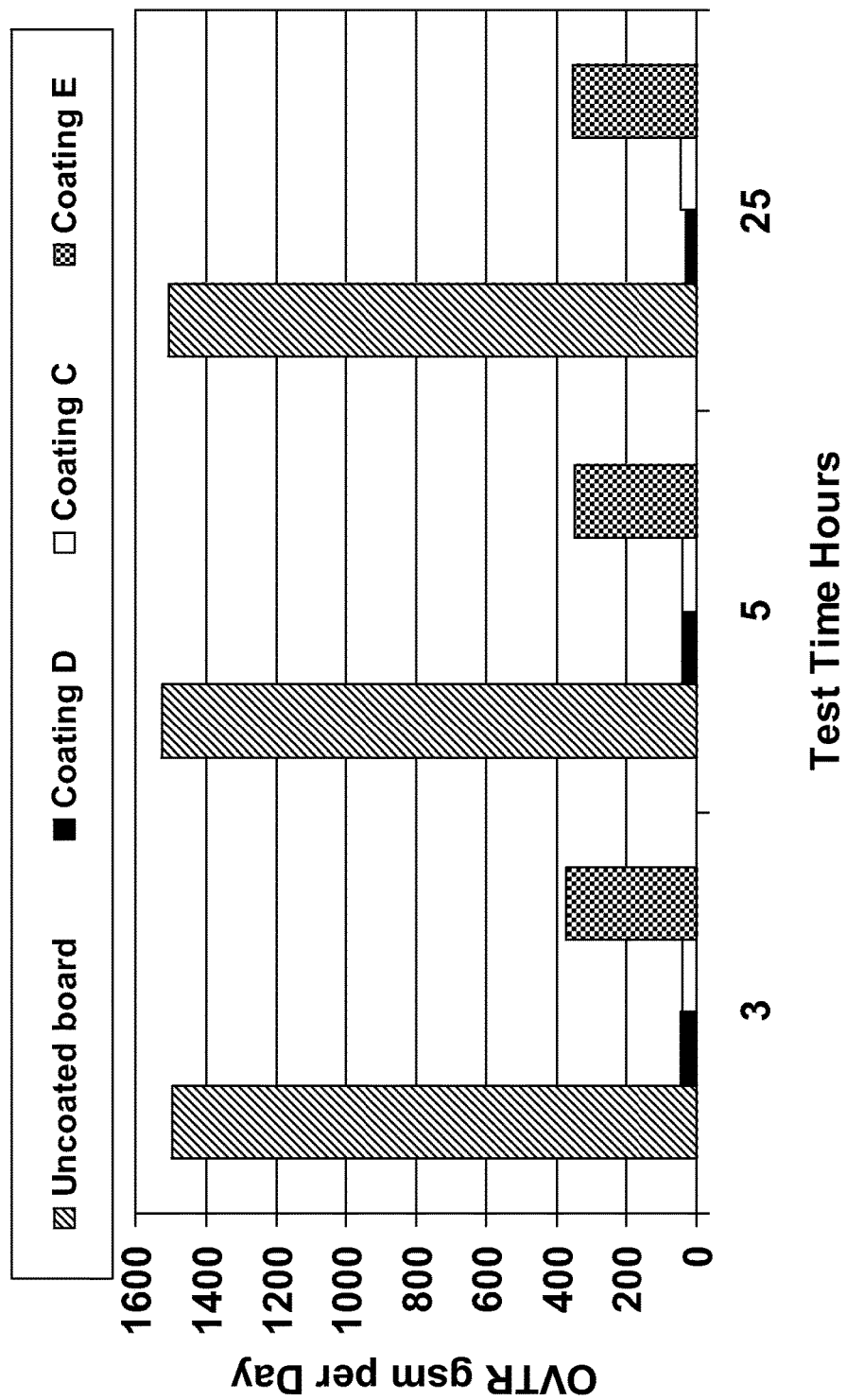

Oil vapour transmission rates for each coated board and the control sample were determined in accordance with the method described above under 'Mineral oil transmission'. Results are shown in FIGS. 4 and 5. The data summarized in FIG. 4 was obtained following n-heptane addition. The data summarized in FIG. 5 was obtained following toluene addition. The data summarized in FIGS. 4 and 5 shows that board flexographic printed with Coating C or D exhibits significantly reduced levels of oil vapour migration. Coating E is better than an uncoated board, but the coating is not as effective as Coating C or D.

The invention claimed is:

1. A paper product comprising:
   a paper substrate, and
   a barrier coating composition comprising an alcohol-based binder and an inorganic particulate,
   wherein the amount of alcohol-based binder present in the barrier coating composition is greater than 20% and less than 50% by weight based on the total weight of the barrier coating composition,
   wherein the paper substrate is a fibrous substrate comprising recycled pulp, and the recycled pulp comprises mineral oil, and
   wherein the barrier coating composition forms at least one coating layer on the paper substrate and has a total coat weight ranging from 5 g/m² to 15 g/m².

2. A paper product according to claim 1, wherein the paper substrate has a first surface of which at least a portion thereof is coated or printed with the barrier coating composition, and a second opposing surface which is coated or printed with a composition which comprises mineral oil.

3. A paper product according to claim 1, wherein the paper substrate has opposing first and second surfaces, both of which are coated with the barrier coating composition.

4. A paper product according to claim 1, wherein the paper product is paper board.

5. A paper product according to claim 1, wherein mineral oil transmission through said barrier coating is such that the reduction in measured IR intensity at 2920 cm$^{-1}$ is less than 20.0%, as determined by ATR-FTIR spectroscopy when a single drop of mineral oil is applied to a side of the paper product opposite said barrier composition.

6. A paper product according to claim 1, wherein mineral oil transmission through said barrier coating is such that the reduction in measured IR intensity at 2920 cm$^{-1}$ is less than 1.0%, as determined by ATR-FTIR spectroscopy when a single drop of mineral oil is applied to a side of the paper product opposite said barrier composition.

7. A paper product according to claim 1, wherein the inorganic particulate is selected from an alkaline earth metal carbonate, an alkaline earth metal sulphate, an aluminosilicate, talc, perlite, diatomaceous earth, magnesium hydroxide, aluminum trihydrate, or combinations thereof.

8. A paper product according to claim 1, wherein the inorganic particulate comprises talc or mica.

9. A paper product according to claim 1, wherein the inorganic particulate comprises an aluminosilicate.

10. A paper product according to claim 1, wherein the inorganic particulate comprises kaolin having a shape factor of at least 30.

11. A paper product according to claim 1, wherein the inorganic particulate comprises kaolin having a shape factor of at least 90.

12. A paper product according to claim 1,
wherein the alcohol-based binder comprises polyvinyl alcohol, and
wherein the amount of alcohol-based binder present in the barrier coating composition is greater than 25% by weight based on the total weight of the barrier coating composition.

13. A paper product according to claim 1, wherein the composition has a weight ratio of inorganic particulate to alcohol-based binder ranging from 3:1 to 1:3.

14. A paper product according to claim 1, wherein the at least one coating layer comprises a series of coating layers, and wherein the barrier coating composition is applied using a printing technique, such that the barrier coating composition has a uniform thickness.

15. A paper product according to claim 1, wherein the alcohol-based binder comprises polyvinyl alcohol obtained by partial hydrolysis of polyvinyl acetate, and at least 85 mole % of the acetate groups of the polyvinyl acetate are hydrolysed.

16. A paper product according to claim 15, wherein 87 mole % to 89 mole % of the acetate groups of the polyvinyl acetate are hydrolysed.

17. A paper product comprising:
a paper substrate comprising mineral oil, the paper substrate having a first surface and a second surface opposite the first surface; and
a barrier composition covering at least a portion of the first surface and the second surface, the barrier composition comprising, with respect to the total weight of the barrier composition:
greater than 20% by weight of an alcohol-based binder; and
greater than 50% by weight of an inorganic particulate, wherein the inorganic particulate has a $d_{90}$ diameter of less than 3 μm;
wherein the barrier composition reduces or prevents passage of the mineral oil through the barrier composition.

18. The paper product of claim 17, wherein the barrier composition comprises greater than 25% by weight of the alcohol-based binder with respect to the total weight of the barrier composition, and wherein the barrier composition has a total coat weight ranging from 5 g/m$^2$ to 15 g/m$^2$.

19. A paper product comprising:
a paper substrate; and
a barrier coating covering at least a portion of the paper substrate, the barrier coating comprising:
a first layer comprising a polyvinyl alcohol binder obtained by partial hydrolysis of polyvinyl acetate, such that the polyvinyl alcohol binder comprises acetate functional groups and hydroxyl functional groups; and
a second layer comprising a barrier composition comprising the polyvinyl alcohol binder and greater than 50% by weight, with respect to the total weight of the barrier composition, of particulate kaolin having a shape factor of at least 90.

* * * * *